June 16, 1931. L. L. HAAS 1,809,846
AIR RECEIVING AND DIRECTING MEANS FOR ROTARY FANS
Filed June 7, 1926 2 Sheets-Sheet 1
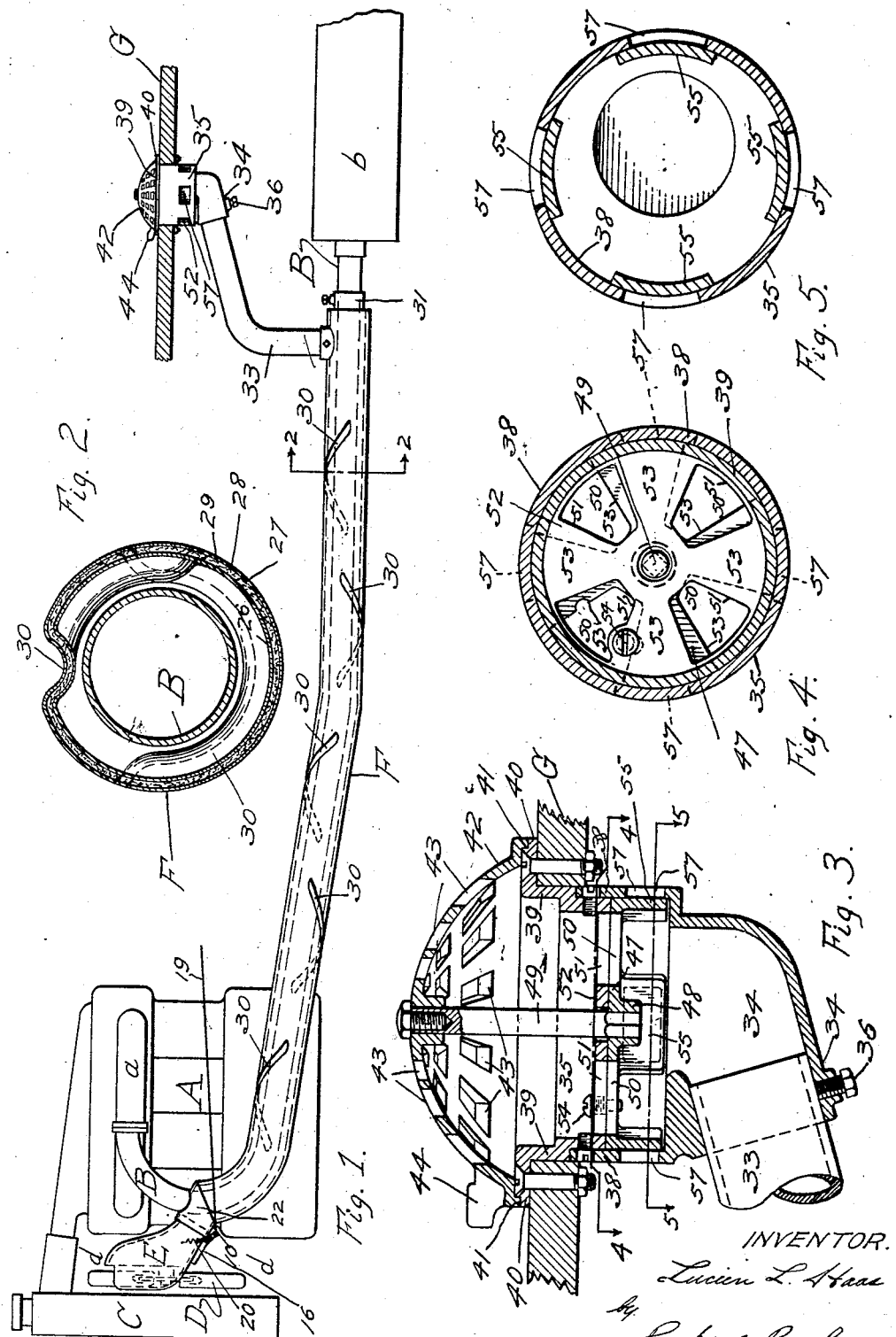
INVENTOR.
Lucien L. Haas
by
Parker & Prochnow
ATTORNEYS.

June 16, 1931.    L. L. HAAS    1,809,846
AIR RECEIVING AND DIRECTING MEANS FOR ROTARY FANS
Filed June 7, 1926    2 Sheets-Sheet 2

INVENTOR.
Lucien L. Haas
by
Parker & Prochnow
ATTORNEYS.

Patented June 16, 1931

1,809,846

UNITED STATES PATENT OFFICE

LUCIEN L. HAAS, OF BUFFALO, NEW YORK, ASSIGNOR TO BUFFALO PRESSED STEEL COMPANY, INC., OF BUFFALO, NEW YORK

AIR RECEIVING AND DIRECTING MEANS FOR ROTARY FANS

Application filed June 7, 1926. Serial No. 114,272.

This invention relates to air directing means of the kind adapted to receive air from a fan which propels air in the general direction of its axis for directing the air wherever it may be useful, for example, for either heating or cooling a vehicle.

The objects of this invention are to provide an air receiving and directing device adapted to be used in connection with a fan adapted to propel air in the general direction of its axis to efficiently deflect the air to form a strong blast; also to provide means of novel construction for using a blast of air for heating a motor vehicle; also to provide means of improved construction for using a blast of air for cooling a motor vehicle or parts thereof; also to provide a valve of improved construction for either admitting a current of warm air into the interior of an automobile or for causing the same to be discharged outside of the body of the automobile; also to improve the construction of devices of this kind in other respects hereinafter specified.

In the accompanying drawings,

Fig. 1 is a side elevation of an air directing apparatus or device embodying my invention, showing the same applied to an internal combustion engine and showing means for passing an air blast around the exhaust pipe of the internal combustion engine for the two-fold purpose of providing heated air which may be used for heating the automobile and for cooling the exhaust pipe.

Fig. 2 is a transverse section of the exhaust pipe and its covering, on an enlarged scale on line 2—2, Fig. 1.

Fig. 3 is an enlarged, sectional elevation of the valve member for admitting the warmed air into the interior of the automobile or for causing the same to be discharged outside of the automobile body.

Figs. 4 and 5 are sectional, plan views thereof on lines 4—4 and 5—5, respectively, Fig. 3.

Figure 6:
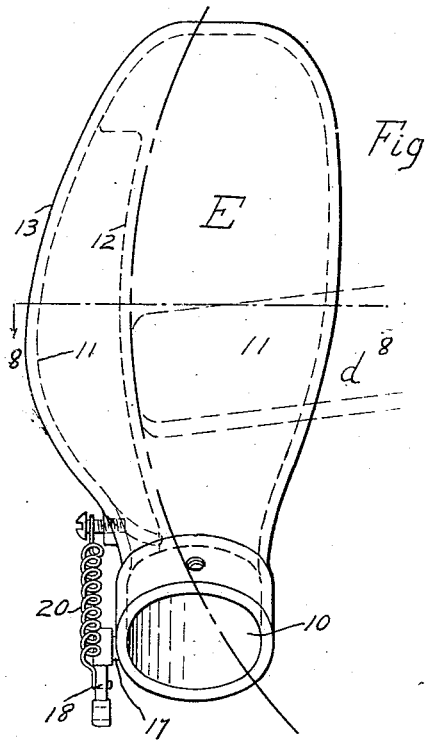

Fig. 6 is a rear view of an air receiving and directing member embodying my invention showing the relation of the same to the blades of an automobile cooling fan.

Figure 7:
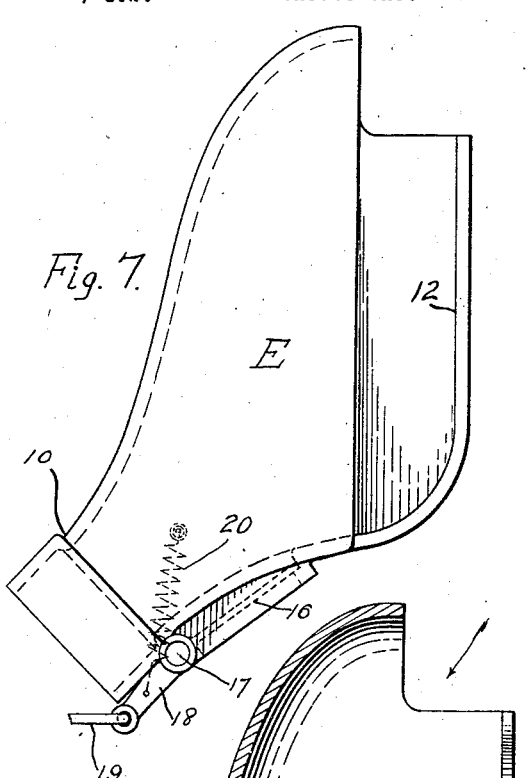

Fig. 7 is a side elevation thereof.

Figure 8:
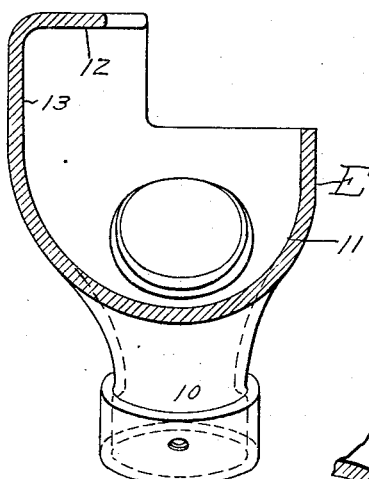

Fig. 8 is a sectional view thereof on line 8—8, Fig. 6.

Figure 9:
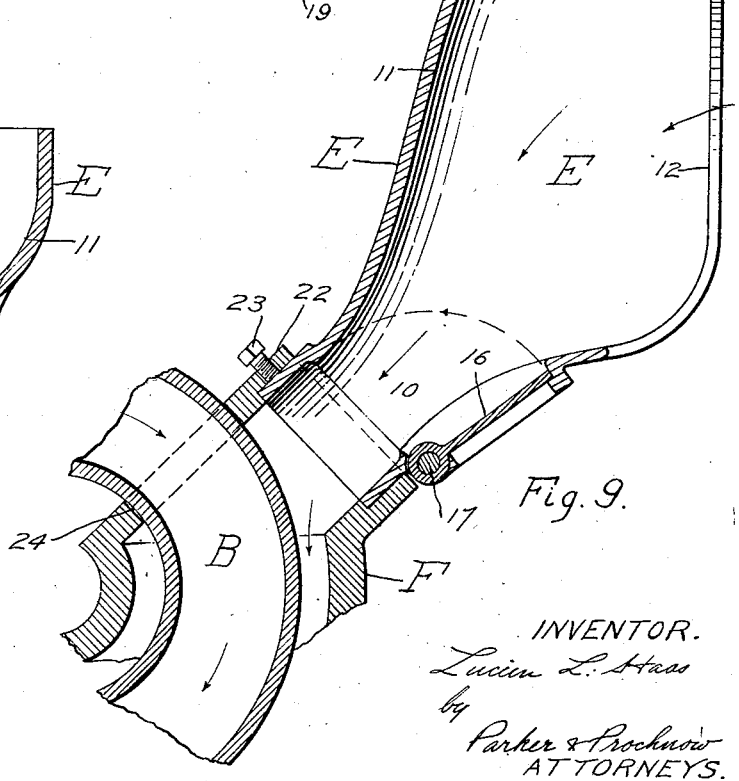

Fig. 9 is a central, sectional view thereof.

A represents an internal combustion engine having an exhaust manifold $a$ from which the exhaust gases are conducted to an exhaust pipe B which extends from the engine to the rear of the vehicle and terminates in a muffler $b$. C represents the usual radiator through which the cooling liquid of the engine passes to give up a part of its heat to the air passing through the radiator, and D represents the usual cooling fan placed in rear of the radiator for the purpose of assisting in drawing air through the radiator from the front to the rear thereof. These cooling fans commonly used in connection with internal combustion engines include a plurality of inclined and somewhat curved blades $d$ which are arranged at such a pitch as to draw the air rearwardly through the radiator in the general direction of the axis of the fan, and because of their pitch and rapid rotary motion, some of the air acted upon by the fan is also given a radial movement by the blades of the fan. All of these parts have heretofore been commonly employed in connection with internal combustion engines and of themselves constitute no part of this invention.

Heretofore air directing means have been employed in connection with automobile heating systems, which air directing means consisted merely of a funnel or funnel shaped member arranged in rear of the cooling fan for directing the air to some suitable passage for heating the air and then transmitting the same into the interior of an automobile. These funnel shaped air receiving members, however, have been found to be very inefficient and produce only a feeble current of air through a pipe, which is not sufficient in cold weather to raise the temperature of an automobile sufficiently to make the interior of the automobile comfortable for the occupants.

The air directing and receiving member embodying my invention is so shaped that it is capable of receiving not only air discharged rearwardly from a fan, but also for receiving some of the air discharged radially therefrom, and for so directing the two currents of air that they act in conjunction with each other and thus produce a strong blast of air, which when heated by waste heat from the engine exhaust manifold or from the exhaust pipe, is capable of effectively heating the interior of an automobile in extremely cold weather. It is not, however, intended to limit the invention to the use of this air for heating an automobile since obviously the air can be used for other purposes, and in fact is also shown in the accompanying drawings as used for cooling the interior of an automobile during warm weather by carrying away the heat of the exhaust pipe. The air receiving and directing member may be used in connection with any fan adapted to direct air in a direction substantially parallel to its axis of rotation and it is not intended to limit this member for use in connection with cooling fans for internal combustion engines.

E represents generally my air receiving and directing member which is provided with a restricted air discharge passage or neck 10 and an enlarged or flaring part, the open air receiving end of mouth of which is arranged adjacent to outer portions of the fan blades. The enlarged or flaring portion of the air receiving device includes a part 11 arranged in the rear of the path of movement of the outer portions of the fan blades $d$, the largest end of the flaring portion being arranged in proximity to the rear faces or edges of the fan blades. This flaring portion 11 tapers rearwardly toward the reduced neck portion 10 through which the air is discharged from the air directing and receiving member. The air directing and receiving member also includes a forwardly extending part or projection 12, which projects forwardly beyond the front edge of the part 11 and around the peripheral portions of the blades of the fan so as to receive the air discharged radially or tangentially from the ends of the fan blades. This forwardly projecting portion 12 of the air receiving member preferably extends approximately up to or beyond the front edges of the fan blades, and bulges laterally as shown at 13 to form a deflecting or guiding pocket for the air discharged from the ends of the fan blades, this pocket preferably also tapering toward the reduced discharge end 10 of the air receiving device.

The air discharged from the fan blades $d$ also flows more or less in the direction of rotation of the fan blades and consequently the air receiving and directing device E is so arranged that the flaring portions 11 and 13 thereof extend in the general direction of the resultant of the flow of air discharged from the fan. Consequently by means of the construction shown, the air receiving and distributing device takes air from the rear as well as from the sides of the fan blades and brings together the air flowing in different directions and deflects the same into the general or resultant direction of movement of the air from the fan at the portions thereof where the air receiving device is located, so that the flow of air from these various portions of the fan is directed toward the neck or reduced portion 10 of the air receiving device and forms a strong blast, due largely to the fact that the flaring portion of the air receiving device or member is shaped to receive efficiently all the air discharged from the portion of the fan at which the device is located, and that this air is so guided or deflected in the receiving member that no radical or abrupt change is made in the flow of the air in passing to the neck 10 of the air receiving device. In other words the air receiving device is arranged so as to utilize the resultant velocity of the axial flow through the fan and radial flow due to the centrifugal action, by receiving the air in the direction of its flow and guiding it with a minimum friction to the neck portion or outlet 10 of the air receiving device.

The air receiving device may be provided, if desired, with a valve for causing the air to be discharged directly to the atmosphere instead of to the neck or discharge passage 10. In the construction shown for this purpose a substantially circular disk valve 16 is provided which is secured to a rod or shaft 17 journalled on a part of the air receiving device E, and the valve is adapted to be swung in the direction of the arrows shown in Fig. 9 into a position in which the valve 16 closes the discharge opening 10 of the air receiving device. On the exterior of the air receiving device the rod or shaft 17 may be provided with an extension or arm 18 connected to a link 19 for shifting the position of the valve, and a spring 20 is connected to the arm 18 in such a manner that the spring tends to hold the valve either in its open or shut position, the arm 18 being at one side of its dead center position with reference to the spring and the pivoted rod or shaft 17 when the valve is closed and at the other side of the dead center position when the valve is open. Other means for controlling the discharge of air from the air receiving device may be employed, if desired.

My improved air receiving and directing device has been found to be very efficient when used in connection with the heating of an automobile, and if desired for this purpose, the air receiving device may be connected with a jacket or tube F extending around the exterior of the exhaust pipe B or other heated part of an engine, the tube or jacket F being provided at its air receiving end with a connection 22 to which the air receiving member E may be secured in any suitable or desired manner, for example, by means of a set screw 23 shown in Fig. 9, which passes through the connection member 22 and engages the neck portion 10 of the air receiving device. The receiving end 22 of the jacket F may also be provided with a suitable hole or aperture 24 through which the exhaust pipe B passes.

The jacket F may be of any suitable or desired construction, consisting either of a single thickness of metal, or, if desired, the jacket may be constructed as shown in Fig. 2 including inner and outer tubular walls or shells 26 and 27, preferably made of sheet metal, the two jackets being spaced apart and providing an annular space 28 for a suitable heat insulating medium 29. The jackets may also be provided with a number of integral depressed portions 30 extending more or less helically or spirally partly around various portions of the jacket and thus forming guides or vanes which direct the flow of air more or less spirally around the space between the jacket and the exhaust pipe B to assure a uniform heating of the air and corresponding absorption of heat from the exhaust pipe due to the passage of the air through the space between the jacket and the exhaust pipe. These depressed portions also serve to correctly position the jacket on the exhaust pipe. The rear end of the jacket may be provided with any suitable cap or sleeve 31 closing the rear end of the jacket and securing the same in correct relation to the exhaust pipe. The jacket shown is provided with a discharge pipe 33 leading upwardly from the jacket to the portion of the floor of the automobile through which the warm air is to be discharged. A jacket of any other suitable construction may be provided and, if desired, the jacket may be arranged around the exhaust manifold or other heated member.

Any suitable valve may be provided at the discharge end of the pipe 33 for controlling the flow of hot air into the interior of the automobile, and preferably this valve is also provided with means for automatically opening or uncovering discharge openings for discharging the warm air to the exterior of the car when the air is not required for heating the interior of the car. In the particular construction shown the upper or discharge end of the air discharge pipe 33 is secured to an air inlet passage or connection 34 arranged at the lower end of a lower valve housing 35, a set screw 36 being preferably employed to hold the pipe 33 and valve housing 35 in correct relation to each other. The lower valve housing 35 includes an annular wall 38 and which in turn is connected to an annular wall of an upper valve housing 39 which has an annular outwardly extending flange 40 which may be suitably bolted to the floor of the car. The upper valve housing 39 is provided at its upper face with an annular shoulder 41 which forms a bearing or seat for a corresponding shouldered portion on the lower end of a perforated register or dome 42 provided with a plurality of openings 43 through which the hot air may be discharged to the interior of the car. This dome may, of course, be replaced by a substantially flat perforated plate, if desired, and in the construction shown is provided with a handle portion or projection 44 which facilitates the turning of the perforated air discharge member 42.

The control of the flow of air is preferably effected by means of a valve 47 which is provided with a central hub portion 48 connected by means of a rod or shaft 49 with the perforated air discharge member or dome 42 so that the rotation of the air discharge member 42 effects a corresponding rotation of the valve 47. This valve is provided at its upper face with a series of sector shaped openings 50 adapted to register with corresponding openings 51 formed in a web 52 of the upper valve housing 39. The air discharge openings 51 of the stationary web 52 are arranged alternately with corresponding imperforate portions 53, as is usual in valves of this kind so that when the openings 50 in the valve member 47 are arranged in registration with the imperforate portions 53 of the stationary web 52, the discharge of air into the interior of the vehicle is prevented. A screw or plug 54 secured to a part of the fixed valve member or plate 52 limits the turning movement of the valve 47 in either direction.

The valve member 47 is also provided with a plurality of downwardly extending segmental flange portions 55 which are adapted to move along the interior surface of the annular wall 38 of the lower housing 35 of the air discharge device. This annular wall is provided at intervals with openings 57 which are so arranged relatively to the downwardly projecting flange portions 55 of the valve and to the openings 50 and 51 respectively of the valve and the stationary plate 52, that when the valve member 47 is put into a position to prevent the discharge of hot air into the interior of the vehicle, the openings 57 of the annular wall 38 will be uncovered by the downwardly projecting flange portion 55 of the valve so that the hot air is discharged to the exterior of the vehicle body. On the other hand when the valve is set into a position to permit the discharge of warm air into the interior of the vehicle, the portions 55 of the valve close the discharge openings 57. The openings 57 of the lower valve housing member 35 are arranged below the floor G of the vehicle so that the hot air discharged through these openings discharges beneath the floor of the vehicle where it will not affect the temperature of the interior of the vehicle. It will be obvious, of course, that other means for controlling the flow of air into the interior of the car or for permitting the air to be discharged exteriorly of the car may be provided, if desired.

As the result of this construction the air directing device may be used for heating the interior of the car when the valve member 47 is set to permit the discharge of hot air into the interior of the car. When, however, the valve member is set to prevent the discharge of hot air into the interior of the car, the hot air by being discharged through the openings 57 causes a decided cooling of the interior of the car for the reason that the exhaust pipe B which ordinarily has a considerable heating effect upon the interior of the car because of its proximity to the floor and because of the radiation of heat from the pipe to the floor, is prevented by the jacket F. Consequently in hot summer weather when the valve 47 is set to prevent the heating of the interior of the vehicle, the air directing device functions to keep the interior of the vehicle cool by preventing the transmission of heat from the exhaust pipe to the floor of the vehicle.

I claim as my invention:—

1. An air receiving device adapted for use in connection with a rotary fan having pitched blades, said device having an L-shaped flaring mouth, one arm of which extends partly in rear of a portion of the path of movement of the fan blades and the other arm beyond an arc of the path of movement of the peripheral portions of said blades, said device converging to a reduced neck portion so as to bring together various currents of air discharged by said fan.

2. An air receiving device adapted for use in connection with a rotary fan having pitched blades, said device having an L shaped flaring mouth formed to receive air from the rear and a side of a fan, and to direct the air to a restricted discharge opening.

3. An air receiving device adapted for use in connection with a rotary fan having pitched blades, said device having an L-shaped flaring mouth one arm of which extends partly in rear of the path of movement of the fan blades and the other arm beyond an arc of the path of movement of the peripheral portions of said blades, said device extending from its mouth rearwardly and somewhat along the said arc in the direction of travel of the blades over said mouth and converging to a restricted discharge opening.

4. An air receiving device adapted for use in connection with a rotary fan having pitched blades, said device comprising a collecting shell having an open face of smaller area than the area covered by the moving blades and disposed at the rear of the blades and laterally of the fan axis adjacent the outer ends of the blades as the blades move past the shell, said shell having a portion of its wall surrounding the open face extending forwardly of the path of rotation of said blades to collect and direct into said shell a portion of the air displaced somewhat radially from the axis of rotation of said blades, as well as a portion of the rearwardly displaced air.

5. An air receiving device adapted for use in connection with a rotary fan having pitched blades, said device comprising a collecting shell having an open face of smaller area than the area covered by the moving blades and disposed at the rear of the blades and laterally of the fan axis adjacent the outer ends of the blades as the blades move past the shell, said shell having a portion of its wall surrounding the open face extending forwardly of the path of rotation of said blades and then flanged towards the axis of rotation of said blades to form a cup like section of the shell at the ends of the blades to collect and direct into said shell a portion of the air thrown somewhat radially by said blades as well as a portion of the rearwardly displaced air.

6. An air receiving device for use in connection with a rotary fan having pitched blades, comprising said fan, a funnel shaped shell in the rear of said fan and having its large end open and disposed adjacent and forwardly partially past and facing the outer ends of the blades during a portion of their travel in rotation in such a position as to receive a portion of the air displaced somewhat radially and also rearwardly by the blades, in an angular portion of their travel and to escape the air displaced by the blades during the remainder of their angular travel.

7. An air receiving device for use in connection with a rotary fan having pitched blades, comprising a shell diverging from a restricted discharge orifice to form an open somewhat L-shaped receiving mouth whereby when said open mouth is disposed at the rear of and facing said blades with an arm of the L extending forwardly somewhat beyond the ends of the blades when passing, said shell will collect air displaced both rearwardly and somewhat radially from said blades.

LUCIEN L. HAAS.